US012789989B2

(12) United States Patent
Scott-Nash et al.

(10) Patent No.: US 12,789,989 B2
(45) Date of Patent: Nov. 10, 2026

(54) APPARATUS AND METHODS FOR UNMANNED AERIAL VEHICLE SERVICING OF MODULAR DEVICE ASSEMBLY

(71) Applicant: McAfee, LLC, San Jose, CA (US)

(72) Inventors: Mark E. Scott-Nash, Arvada, CO (US); Glen J. Anderson, Beaverton, OR (US); Ned M. Smith, Beaverton, OR (US); Cedric Cochin, Portland, OR (US); Igor Muttik, Berkhamsted (GB)

(73) Assignee: McAfee, LLC, San Jose, CA (US)

( * ) Notice: Subject to any disclaimer, the term of this patent is extended or adjusted under 35 U.S.C. 154(b) by 24 days.

(21) Appl. No.: 18/771,452

(22) Filed: Jul. 12, 2024

(65) Prior Publication Data

US 2025/0002147 A1 Jan. 2, 2025

Related U.S. Application Data

(60) Continuation of application No. 16/813,232, filed on Mar. 9, 2020, now Pat. No. 12,054,250, which is a (Continued)

(51) Int. Cl.
*B64C 39/02* (2023.01)
*B64U 101/00* (2023.01)
(Continued)

(52) U.S. Cl.
CPC ......... *B64C 39/024* (2013.01); *G06Q 10/047* (2013.01); *G06Q 10/06316* (2013.01); *G06Q 10/20* (2013.01); *G08G 5/21* (2025.01); *G08G 5/26* (2025.01); *G08G 5/55* (2025.01); *G08G 5/57* (2025.01); *H01R 13/6205* (2013.01);
(Continued)

(58) Field of Classification Search
CPC ..................................................... B64C 39/024
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |

(Continued)

FOREIGN PATENT DOCUMENTS

| | | |
|---|---|---|
| KR | 101705838 B1 | 2/2017 |
| WO | 2016154946 A1 | 10/2016 |

OTHER PUBLICATIONS

Roberto Quilez et al. Docking autonomous robots in passive docks with Infrared sensors and QR codes. International Conference on Testbeds and Research Infrastructures for the Development of Networks & Communities (TridentCOM), Vancouver, Canada. hal-01147332, Jun. 2015 (hereinafter “Quilez”). (Year: 2015).*

*Primary Examiner* — Jean Paul Cass
(74) *Attorney, Agent, or Firm* — Patent Capital Group

(57) ABSTRACT

Particular embodiments described herein provide for modular device assemblies and methods for enabling maintenance and servicing, particularly by an unmanned aerial vehicle. A device assembly comprises a plurality of modules, each module having control circuitry, a communications port and contact points to couple the modules. When the modules are coupled, the communications ports are connected to create a bus for communications between the modules. The modular device structure where modules are removable and replaceable allows for an unmanned aerial vehicle to perform maintenance on the device.

13 Claims, 10 Drawing Sheets

Related U.S. Application Data division of application No. 15/279,879, filed on Sep. 29, 2016, now Pat. No. 10,604,251.

(51) Int. Cl.

| | |
|---|---|
| ***B64U 101/30*** | (2023.01) |
| ***B64U 101/60*** | (2023.01) |
| ***G06Q 10/047*** | (2023.01) |
| ***G06Q 10/0631*** | (2023.01) |
| ***G06Q 10/20*** | (2023.01) |
| ***G08G 5/21*** | (2025.01) |
| ***G08G 5/26*** | (2025.01) |
| ***G08G 5/55*** | (2025.01) |
| ***G08G 5/57*** | (2025.01) |
| ***H01R 13/62*** | (2006.01) |

(52) U.S. Cl.

CPC ...... *B64U 2101/00* (2023.01); *B64U 2101/30* (2023.01); *B64U 2101/60* (2023.01)

(56) References Cited

U.S. PATENT DOCUMENTS

| | | | | |
|---|---|---|---|---|
| 6,460,050 | B1 | 10/2002 | Pace et al. | |
| 6,869,320 | B2 | 3/2005 | Haas et al. | |
| 7,322,873 | B2 * | 1/2008 | Rosen .................. | A63H 33/046 446/124 |
| 7,506,155 | B1 | 3/2009 | Stewart et al. | |
| 8,395,496 | B2 | 3/2013 | Joshi et al. | |
| 9,380,949 | B2 | 7/2016 | Schuessler | |
| 10,011,352 | B1 | 7/2018 | Dahlstrom | |
| 10,035,581 | B2 | 7/2018 | Wood | |
| 10,063,113 | B2 | 8/2018 | Holland et al. | |
| 10,501,179 | B2 | 12/2019 | Ljubuncic et al. | |
| 10,762,553 | B2 | 9/2020 | Ricci | |
| 11,521,517 | B2 * | 12/2022 | Karol ..................... | A63H 33/26 |
| 11,660,549 | B2 * | 5/2023 | Schneider .............. | G09B 23/18 446/137 |
| 11,737,627 | B2 * | 8/2023 | Ratanaphanyarat ......................... | A01D 34/008 701/26 |
| 12,109,695 | B2 * | 10/2024 | Malzahn .............. | B25J 19/0033 |
| 2007/0155325 | A1 | 7/2007 | Bambic et al. | |
| 2010/0268409 | A1 | 10/2010 | Vian et al. | |
| 2011/0023096 | A1 | 1/2011 | Xiao et al. | |
| 2014/0355476 | A1 | 12/2014 | Anderson et al. | |
| 2015/0243822 | A1 | 8/2015 | Karam et al. | |
| 2016/0204978 | A1 | 7/2016 | Anderson et al. | |
| 2016/0257357 | A1 * | 9/2016 | Ben-Tzvi ............... | B62D 55/04 |
| 2016/0309346 | A1 | 10/2016 | Priest | |
| 2016/0375579 | A1 | 12/2016 | Muttik | |
| 2017/0183096 | A1 | 6/2017 | Meinhart | |
| 2017/0282089 | A1 * | 10/2017 | Wang ..................... | A63H 11/00 |
| 2018/0171700 | A1 | 6/2018 | Reiner et al. | |
| 2019/0372977 | A1 | 12/2019 | Ben-David et al. | |

* cited by examiner

APPARATUS AND METHODS FOR UNMANNED AERIAL VEHICLE SERVICING OF MODULAR DEVICE ASSEMBLY

CROSS REFERENCE TO RELATED APPLICATION

This Application is a continuation (and claims the benefit of priority under 35 U.S.C. § 120) of U.S. application Ser. No. 16/813,232 filed Mar. 9, 2020, and entitled "APPARATUS AND METHODS FOR UNMANNED AERIAL VEHICLE SERVICING OF MODULAR DEVICE ASSEMBLY" which is a divisional of U.S. application Ser. No. 15/279,879, filed Sep. 29, 2016 and entitled "APPARATUS AND METHODS FOR UNMANNED AERIAL VEHICLE SERVICING OF MODULAR DEVICE ASSEMBLY" (issued on Mar. 31, 2020, as U.S. Pat. No. 10,604,251). The disclosures of the prior Applications are considered part of and are incorporated by reference in the disclosure of this Application.

TECHNICAL FIELD

This disclosure relates in general to the field of modular device assemblies, and more particularly, to apparatus and methods for enabling unmanned aerial vehicle servicing of modular device assemblies.

BACKGROUND

One current trend is commonly known as the Internet of Things (IoT). Generally, IoT is a network of physical objects or "things" embedded with electronics, software, sensors, and connectivity to enable each device to achieve greater value and service by exchanging data with the manufacturer, operator, and/or other connected devices. Each IoT or network device is uniquely identifiable through its embedded computing system but is able to operate within the existing Internet infrastructure and a network.

As device construction has become more robust, resilient, and microscopic, more and more devices are being used to monitor and collect data in remote locations. In these remote locations, long range communication is generally unavailable. Accessing data and performing maintenance on these devices may be challenging.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Disclosed herein are modular device assemblies and methods for enabling maintenance and servicing, particularly by unmanned aerial vehicles (UAVs), commonly referred to as drones.

Devices are being used to monitor and collect data everywhere, even in remote locations. These devices may be in place for years. When devices are placed in remote location, long range communication is generally unavailable as wired connections, require wired infrastructure, and wireless connections, require localized base station infrastructure, which are not always available. Accessing data and performing maintenance on these devices may be challenging for humans, but may be readily performed by UAVs via a localized connection. A UAV may be programmed to autonomously perform maintenance and securely download data from remote devices. A modular device assembly is structured to be compatible with UAV servicing where components may be removed and replaced as a module. The modules within a device are physically and electronically connected. The UAV may physically and electronically connect to a device to facilitate servicing and to provide a means for secure communication.

Figure 1:
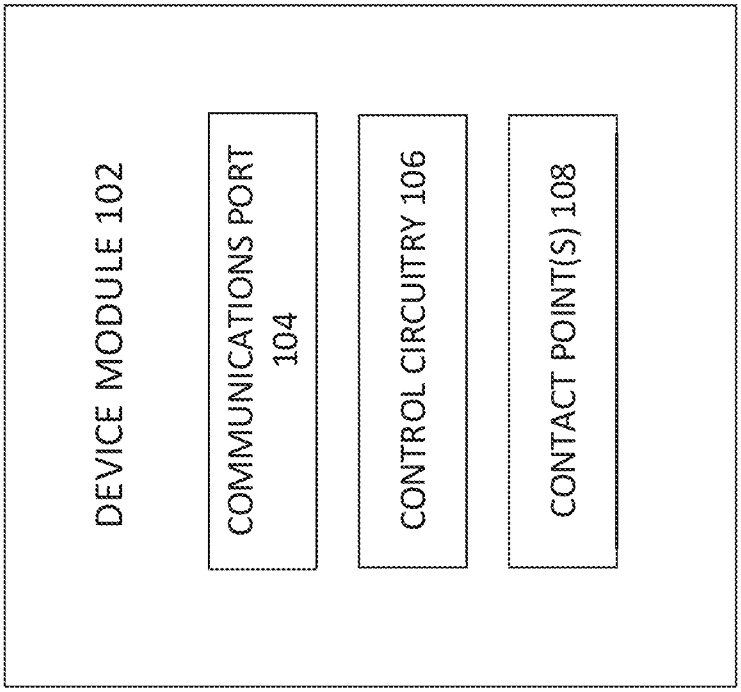
FIG. 1 is a simplified block diagram illustrating an exemplary modular device assembly in accordance with an embodiment of the present disclosure.

FIG. 1 is a simplified block diagram illustrating an exemplary modular device module in accordance with an embodiment of the present disclosure. Each device module 102 may include a communications port 104, control circuitry 106, and one or more contact points 108 for coupling to another module or a base. When the modules are coupled via the contact points, the communications ports are connected to form a bus for communications between modules.

Modular device assemblies may apply to a variety of devices to facilitate maintenance by a UAV, for example, sensor-embedded devices, such as outdoor commercial light pole lighting controllers and smart security cameras, satellite dish controllers, autonomous vehicles, radio receiving and transmission devices to extend a network, and robotic nodes, among others.

Figure 2A:
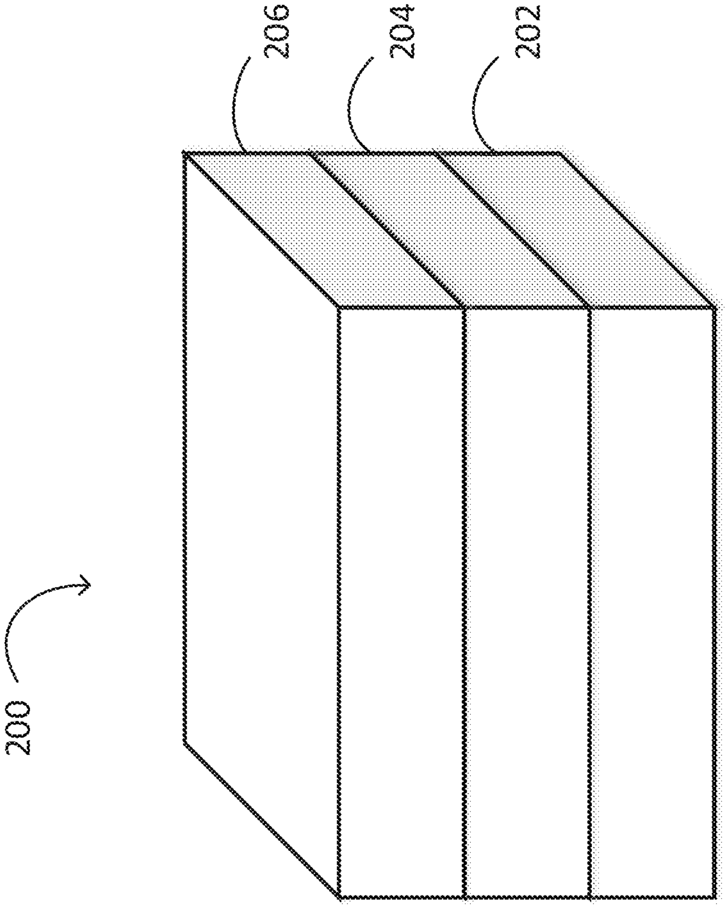
FIG. 2A is a simplified drawing illustrating an exemplary modular device assembly in accordance with an embodiment of the present disclosure.
Figure 2B:
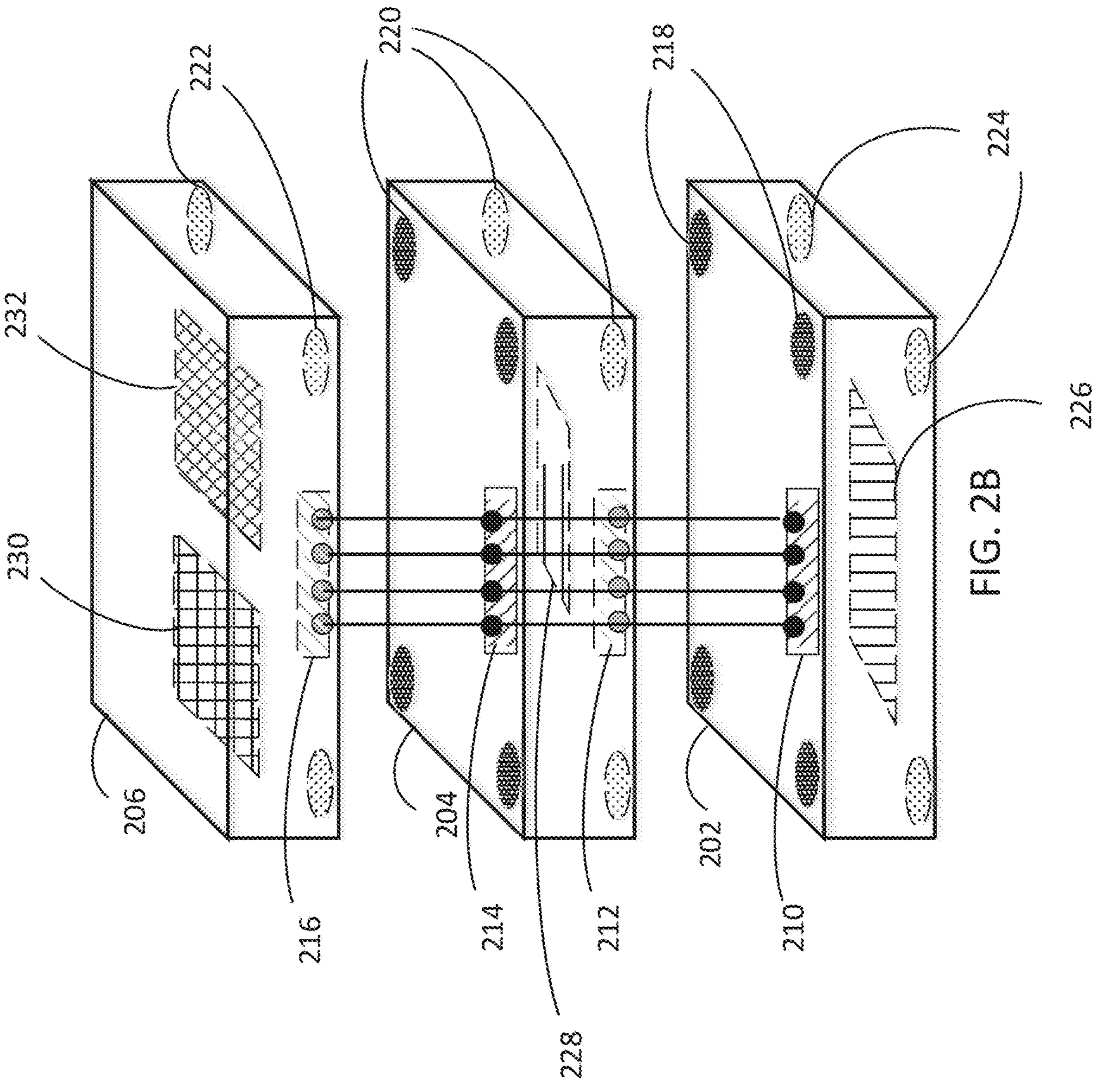
FIG. 2B is an expanded view of FIG. 2A.

FIG. 2A is an exemplary modular device assembly 200 having three stacked modules 202, 204, 206, in accordance with an embodiment of the present disclosure. FIG. 2B is an expanded view of the modular device assembly 200 showing components of each module. Each module comprises a housing or frame having communication ports, contact points for coupling the modules and control circuitry. Additionally, each module will house one or more components of the device. As shown in FIG. 2B, modules 202, 204, 206 have wired bus communication ports 210, 212, 214, 216 for components 226, 228, 230, 232 to communicate across modules 202, 204, 206. Components 226, 228, 230, 232 may be any device assembly component, for example, processor, sensor, memory, battery, or the like. Contact points 218, 220, 222 may be any suitable type of fastener that holds a module in place and allows for easy separation and removal. Each module may have one or more contact points depending on what the module is coupling to, or whether the module is a coupled one more than one side, among other considerations.

A first module 202 has communication port 210, contact points 218 for connecting the first module 202 to the second module 204, and component 226. A first module may have contact points 224 for attaching to a base or other structure. Contact points 224 may be the same or different from contact points 218. For example, contact points 218 may be magnetic while contact points 224 may be bolts or screws. A second module 204 has communication ports 212, 214 located on the bottom and top surfaces of the housing, respectively, contact points 220 for connecting the second module 204 to the first and third modules 202, 206, and component 228. A third module 206 has communication port 216, contact points 222 for connecting to the second module 204, and components 230, 232. The third module may have other components attached to the top surface, such as an antenna.

A module may be of any suitable size and shape, such that it houses the components, fits at its remote location and readily allows for disassembling and reassembling of the modules. For example, the modules may be placed side-by-side, stacked, staggered, or nested, among others. The modules may be configured where a module may be removed without having to remove any other module. For example, the modules may form concentric rings when coupled. A device assembly may have one or more modules, and may have up to 10 or more modules, depending on the complexity of the device assembly and/or the need for each component to be housed on a separate module. Components may be housed in the same module when they have related functions, similar life spans or fit within the module.

Figure 3A:
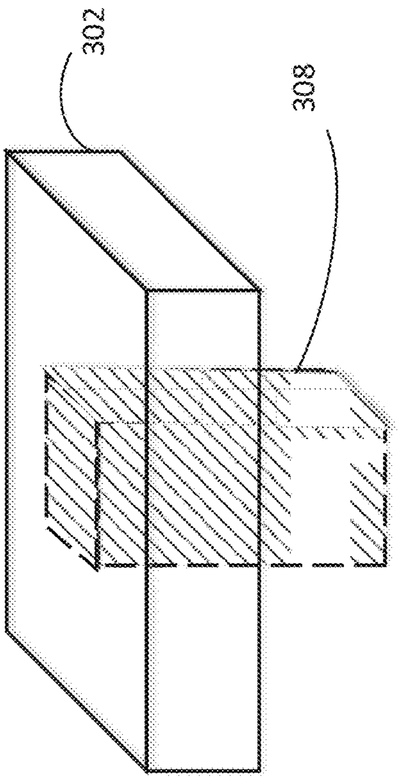
FIGS. 3A-3C are simplified drawings illustrating an exemplary modular device assembly in accordance with an embodiment of the present disclosure.
Figure 3B:
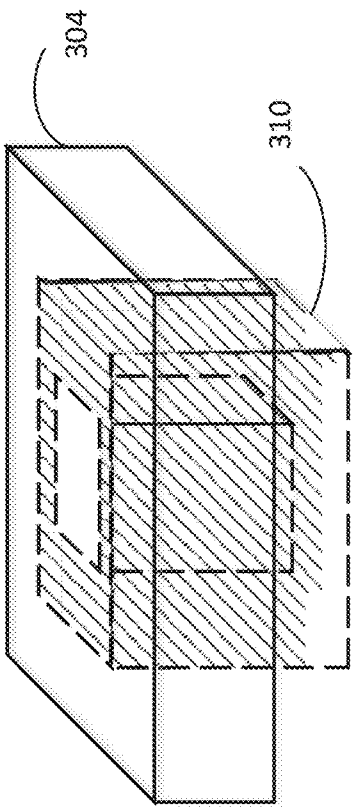
Figure 3C:
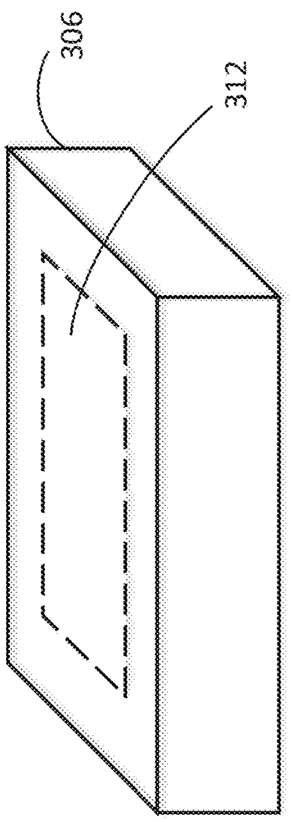

FIGS. 3A-3C is an exemplary modular device assembly where the modules are concentric rather than stacked. FIG. 3A depicts a first module having a frame or housing 302 and a pillar 308 extending down from the center past the bottom edge of the frame 302. FIG. 3B depicts a second module having a frame 304 and a ring or cube with an opening in the center 310 extending down past the bottom edge of the frame 304. FIG. 3C depicts a third module having a frame 306 with an opening 312. The three modules of FIGS. 3A-3C fit together concentrically and when assembled appear as shown in FIG. 2.

Figure 4A:
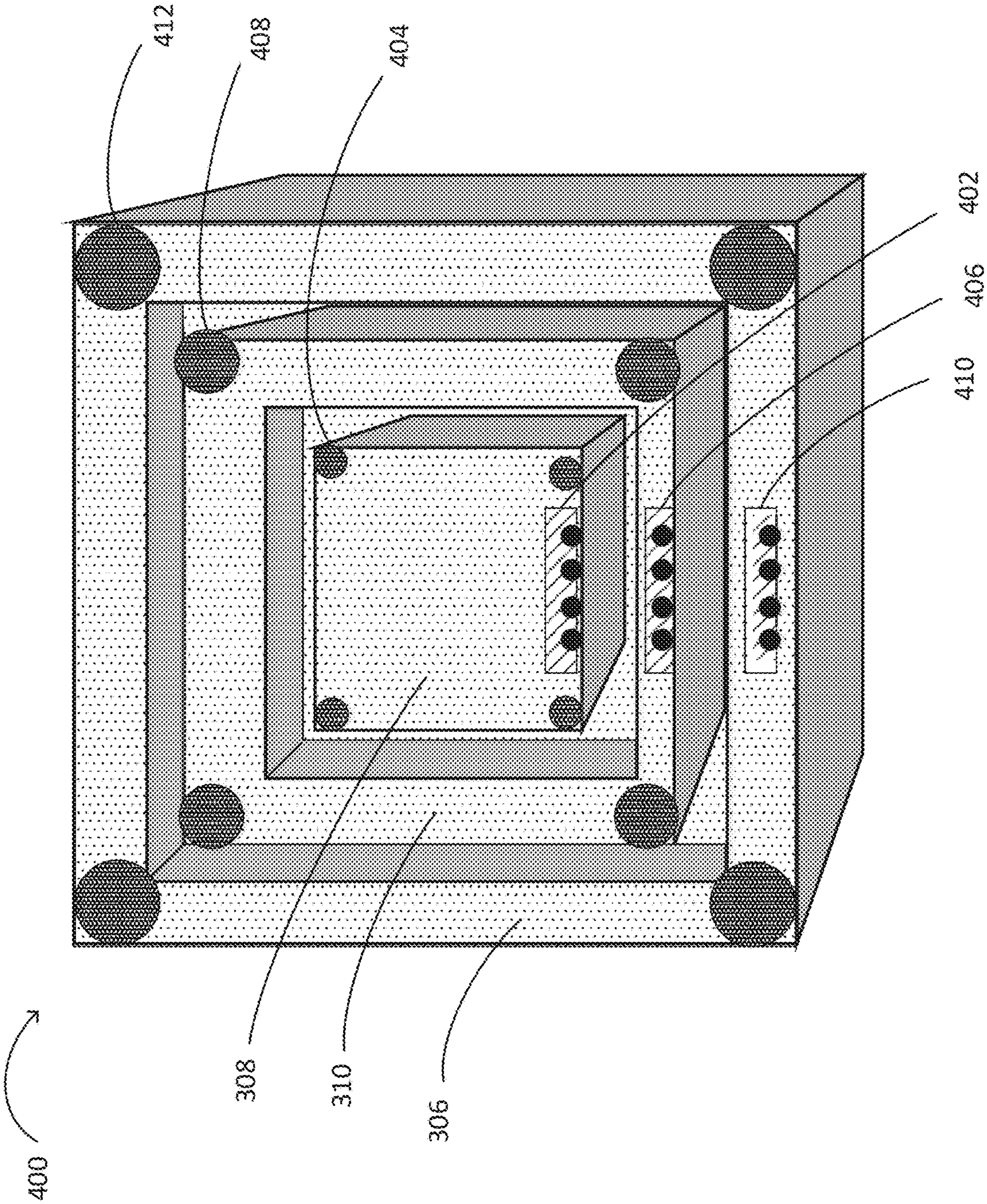
FIG. 4A is a simplified drawing of the bus connections of the modular device assembly of FIGS. 3A-3C viewed from the bottom.

FIG. 4A depicts the device modules in FIGS. 3A-3C assembled 400 as viewed from the bottom. Inner square is pillar 308 of the first module 302 in FIG. 3A. The bottom surface of pillar 308 has communication port 402 and multiple contact points 404 for attaching to a base (shown in FIG. 4B). Inner ring 310 is the extended portion from the second module 304 in FIG. 3B. The bottom surface of inner ring 310 has communication port 406 and multiple contact points 408 for attaching to a base. The outer ring 306 is the frame from the third module 306 in FIG. 3C. The bottom surface of outer ring 306 has communication port 410 and multiple contact points 412 for attaching to a base. The contact points may be placed such that the modules are attached to a base, as shown here in FIG. 4A, or may be placed such that the modules are attached to each other, as shown in FIG. 2B, or may be placed such that the modules are attached to another surface. An electronic contact data bus, such as a universal serial bus (USB) having magnetic contact points to align the digital bus contact points, may be used to create a connection through which an unmanned aerial vehicle may recharge a battery, download software and or firmware images, run diagnostics, run test suites, and perform other manageability functions using a physical (wired) connection or close proximity wireless (e.g. NFC) connection.

Figure 4B:
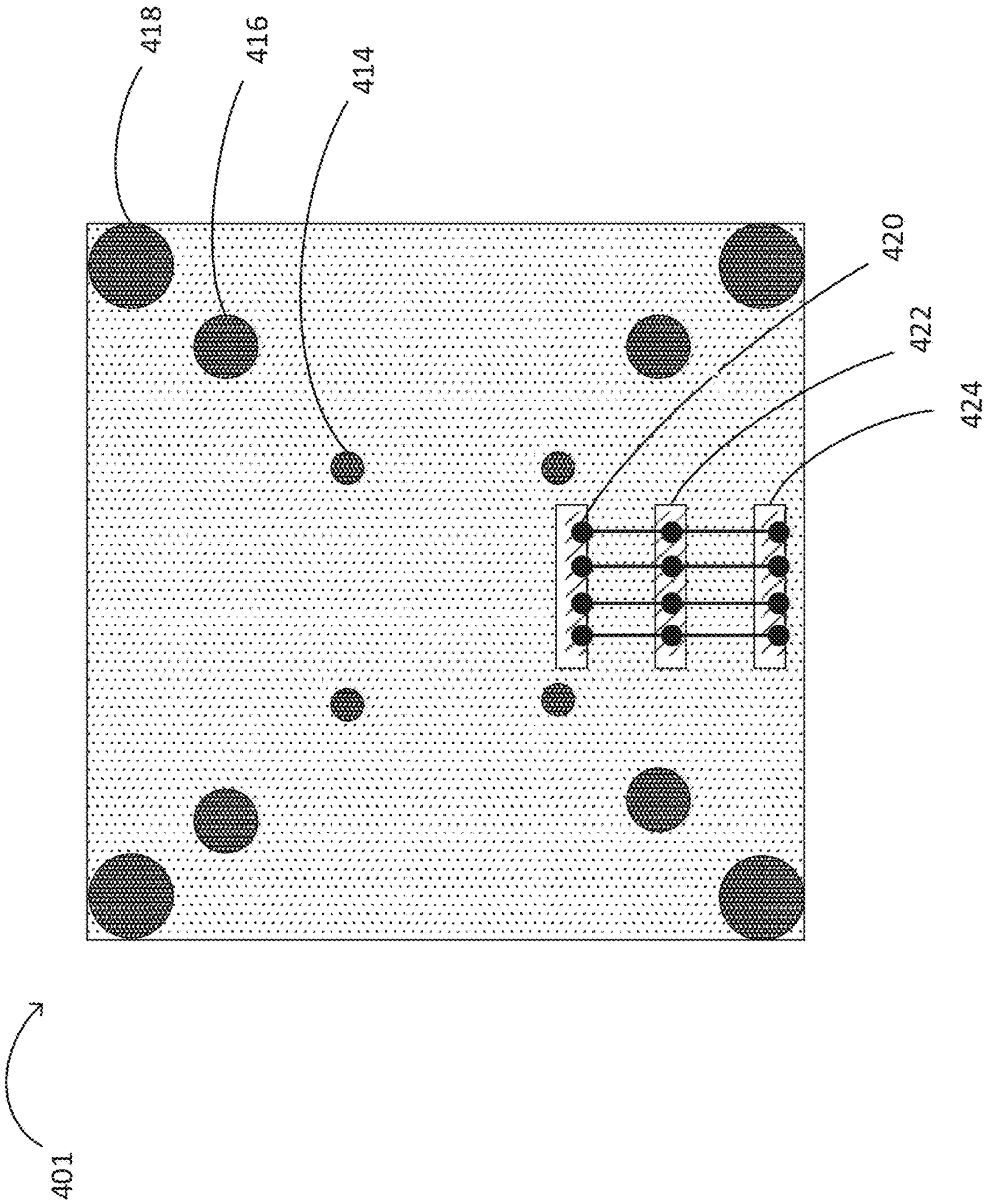
FIG. 4B is a simplified drawing of a base plate having bus connections for the modular device assembly of FIGS. 3A-3C.

FIG. 4B depicts an exemplary base 401 for attaching the assembled device module in FIG. 4A. The base 401 has multiple contact points 414, 416, 418, corresponding to the multiple contact points of the modules 404, 408, 412. The base has three communication ports 420, 422, 424 with a bus corresponding to the communication ports of the three modules 402, 406, 410. The base 401 may include electrical contact points along with the information bus to enable electronic communication between the components on the modules. The base 401 may be made of any suitable material, including, but not limited to, polymers, metals, ceramics, composites, or the like. Material selection may consider the material's ability to withstand environmental conditions, whether the material interferes with device functionality, and cost. The base may include electrical contact points and information bus enabling electronic communication between components on the different modules.

The modular construction of a device simplifies maintenance and service as a defective component may be replaced as a modular unit. For example, the device assembly of FIG. 4A may have a processor and memory in the inner module, may have a battery, motion sensor and camera in the middle module, and may have a radio and antenna in the outer module. If the motion sensor fails, maintenance would require only the middle module to be removed and replaced.

Figure 5:
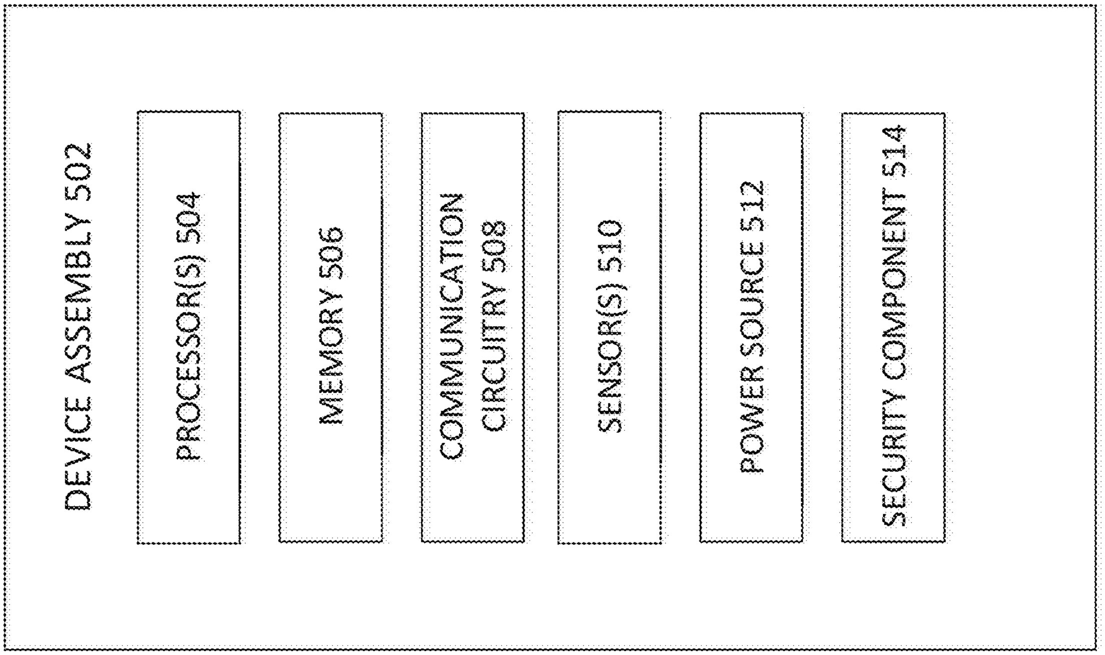
FIG. 5 is a simplified block diagram illustrating an exemplary sensor in accordance with an embodiment of the present disclosure.

FIG. 5 shows an exemplary device assembly 502, according to some embodiments of the disclosure. The device assembly 502 may include one or more processors 504, one or more memory elements 506, communication circuitry 508 for communicating with other entities/devices, and one or more sensors 510.

The device assembly 502 may include one or more processors 504. The processor may execute any type of instructions associated with the device assembly to achieve the operations detailed herein this Specification. The one or more processors 504 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors 504 may be implemented in hardware, software, firmware, or combinations thereof, as appropriate. Software or firmware implementations of the processors 504 may include computer-executable or machine-executable instructions written in any suitable programming language to perform the various functions described. Hardware implementations of the processors 504 may be configured to execute computer-executable or machine-executable instructions to perform the various functions described. The device assembly 502 may include a chipset (not shown) for controlling communications between one or more processors 504 and one or more of the other components of the device assembly 502. The processors 504 may also include one or more application specific integrated circuits (ASICs) or application specific standard products (ASSPs) for handling specific data processing functions or tasks.

The device assembly 502 may include one or more memory elements 506. The memory 506 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 506 may store program instructions that are loadable and executable on the processor(s) 504, as well as data generated or received during the execution of these programs. The memory 506 may have stored thereon software modules and/or instructions associated with the communication circuitry 508 and/or sensor 510, as well as other components of the device assembly 502. The memory 506 may include one or more operating systems (O/S) application software. Each of the modules and/or software stored on the memory 506 may provide functionality for the device assembly 502, when executed by the processors 504.

Each module in the device assembly includes control circuitry and communications ports such that when the modules are coupled via the contact points, the communications ports are connected to form a bus for communications between modules. The device assembly 502 may include additional communication ports for UAVs and other devices to connect to the bus. The device assembly 502 may include commination circuitry 508 for communicating with other sensor assemblies or other devices, such as UAVs. The communication circuitry may include a transmit/receive or radio component for transmitting and/or receiving radio frequency (RF) signals. The radio component may include hardware and/or software to modulate communications signals according to pre-established transmission protocols. In alternative embodiments, non-Wi-Fi protocols may be used for communications between adjacent sensor assemblies 502 and/or other devices in the vicinity, such as Bluetooth, dedicated short-range communication (DSRC), radio with RFID, or other packetized radio communications. The radio component may include any known receiver and baseband suitable for communicating via the communications protocols of the device assembly. The radio component may further include a low noise amplifier (LNA), additional signal amplifiers, an analog-to-digital (A/D) converter, one or more buffers, and digital baseband. In another embodiment, the radio component may have hardware and/or software instructions to communicate via one or more Wi-Fi and/or Wi-Fi direct protocols, as standardized by the Institute of Electrical and Electronics Engineers (IEEE) 802.11 standards, should a temporary Wi-Fi connection be established as described in U.S. Published Application No. 2014/0355476, filed Jun. 3, 2013.

The device assembly 502 may include antennas. Example antennas include, but are not limited to, a communications antenna. The communications antenna may be any suitable type of antenna corresponding to the communications protocols used by the device assembly 502, for example, Wi-Fi antennas, IEEE 802.11 family of standards compatible antennas, directional antennas, non-directional antennas, dipole antennas, folded dipole antennas, patch antennas, multiple-input multiple-output (MIMO) antennas, among others. The communications antenna may be communicatively coupled to a radio component to transmit and/or receive signals, such as communications signals to and/or from other sensor assemblies 502, UAVs and/or other devices.

The device assembly 502 may include one or more sensors 510. A sensor, in its simplest form, is a device that detects a physical characteristic in its environment and then provides a corresponding output. The one or more sensors 510 may be any type of sensor, for example, thermal, photo, chemical, haptic, moisture, air flow, among others. The sensor 510 may be mechanical, electrical, or physical, among others. The sensor 510, for example, may detect temperature in a region over time.

The device assembly 502 may include a power source 512. The power source 512 may be any suitable type of power source, including, for example, a battery, a solar cell, an RFID scan, or the like. RFID and NFC scans that power microcontrollers and sensors in another device via the scan are known in the art of RFID. If the power source 512 is a battery, it may be any suitable type of battery including, but not limited to, wet cells, dry cells, lead-acid, lithium, lithium hydride, lithium ion, or the like, at any suitable voltage and/or output current. The battery may be rechargeable and may be recharged by one or more other power sources, such as a solar cell. The solar cell may be any suitable photovoltaic module constructed by any suitable material and process. Some non-limiting example solar cells may include polycrystalline silicon, crystalline silicon, III-V semiconductor, thin film, quantum dots, or the like. The communication circuitry may further enable the device assembly 502 to transmit and/or receive communications beacons to identify other sensor assemblies and/or UAVs in its relative proximity.

The device assembly 502 may include a security component 514 that has instructions stored thereon that may enhance the security of the device assembly 502. In particular, the security component 514 may include hardware and/or software-based algorithms that may be executed in cooperation with the processors to reduce the possibility of theft of a device assembly 502 and/or the data collected. The security component 514 may have protocols to secure communications with the device assembly 502 and, in some embodiments, require authentication of the device assembly 502 for protection of the privacy and integrity of the exchanged data. In some embodiments, the security component 514 may provide functionality that prevents the device assembly 502 from being reconfigured or altered, without providing authentication credentials, such as a login and/or password. In other words, the security component 514 may enable a “lockout” of the device assembly 502 and/or disable its functionality if the device detects unauthorized access.

Figure 6:
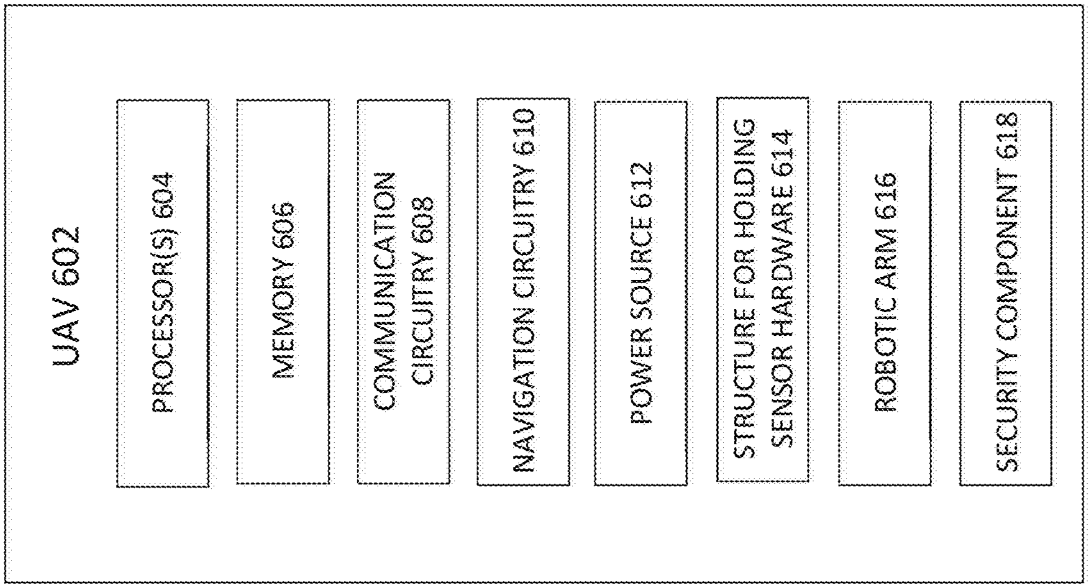
FIG. 6 is a simplified block diagram illustrating an exemplary unmanned aerial vehicle in accordance with an embodiment of the present disclosure.

FIG. 6 shows an exemplary unmanned aerial vehicle (UAV or drone) 602, according to some embodiments of the disclosure. The UAV 602 may include one or more processors 604, one or more memory elements 606, communication circuitry 608 for communicating with a device assembly 502 and other devices, navigation circuitry 610, power source 612, a structure for holding sensor assemblies or sensor modules 614, and, optionally, a robotic arm and associated circuitry 616 and a security component 618.

The one or more processors 604 may be any processor described above for the device assembly processor 504 in FIG. 5.

The one or more memory element 606 may be any memory element described above for the device assembly memory 506 in FIG. 5. The UAV may include a long term memory, such as a flash drive, for storing data uploads and downloads. The UAV may upload data collected by a device assembly and download instructions. For example, if the device assembly is a motion detector, the UAV may upload photos and download instructions on where to point the camera and when to take a picture. The data collected may be encrypted and signed to ensure the privacy and integrity of the data.

The power source 612 may be any power source described above for the device assembly power source 512 in FIG. 5.

The communication circuitry 608 may be as described above for the device assembly communication circuitry 508 in FIG. 5. In some embodiments, the communication circuitry 608 of the UAV may be configured to "listen" for signals from a device assembly. In some embodiments, the communication circuitry may include interfaces to communicate with other UAVS and/or other devices over a network. The communication interface may include receivers, transmitters, or transceivers for with a variety of network types and protocols. The UAV 602 may communicate with a device assembly using a port to connect to the wired bus and may communicate with other UAVs using a network. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

The UAV 602 may optionally include a communications antenna and a GNSS antenna. The communications antenna may be as described previously for the device assembly 502 in FIG. 5. The GNSS antenna may be any suitable type of GNSS antenna to receive GNSS signals, such as GPS time and/or pseudo-range signals. The GNSS may be any one of known current GNSS or planned GNSS, such as the Global Positioning System (GPS), the GLONASS System, the Compass Navigation System, the Galileo System, or the Indian Regional Navigational System. The GNSS may include a plurality of satellites broadcasting radio frequency (RF) signals including satellite transmission time and position information. The satellite RF signals received from three or more satellites via the GNSS antenna may be used by the UAV 602 and the GPS/sensor component, in particular, to obtain navigation data using known GNSS or GPS signal and data processing techniques.

The UAV 602 may include navigation circuitry 610 and other navigation sensors (not shown) to enable the UAV to operate in a variety of modes such as autonomously, semi-autonomously, or manually. For example, an autonomous UAV may be programmed with a path using waypoints (e.g., latitude, longitude, elevation) that the UAV follows and the returns back to its origination point. Automatic object detection and avoidance may be used when a UAV is in an autonomous mode. A semi-autonomous UAV may be programmed to navigate to a specific spot and then wait for further instructions. Manual control may include a user using a remote control to control the UAV. The UAV 602 may use navigation data and/or navigation sensors to navigate, autonomously or otherwise, to device assembly locations. Navigation sensors may include, for example, temperature sensors, pressure sensors, electro-optical sensors, infrared sensors, depth cameras, camera arrays, microphone arrays, gyroscopes, accelerometers, proximity sensors, microphones, and magnetometers. The navigation data may include data representing a geographic area including roads, bridges, cell towers, etc. and their associated positioning coordinates (e.g., GPS or GLONASS). The navigation data may further include altitude data of the geographic area. UAV navigation is known in the art; see, for example, https://en.wikipedia.org/wiki/Unmanned_aerial_vehicle.

The UAV 602 may include a structure or region 614 for attaching a device assembly and/or other replacements parts. The device assembly may be attached by any suitable means, including but not limited to, electromagnet, mechanical fastener, Velcro strap, ties, and the like. The device assembly may be placed on the UAV 602 by another device or by a robot arm 616 of the UAV 602. The UAV 602 may include one or more robot arms 616 having a grabbing device for attaching a device assembly to the UAV and for moving and replacing a device assembly or modules. The grabbing device may include an electromagnet, a mechanical grasping mechanism, or any other suitable means for attaching a device assembly, as a whole, and/or modules to the robotic arm. In some embodiments, the robot arm 616 may be patterned according to the device assembly structure. As in FIG. 3, the robot arm 616 may have a similar concentric pattern of arms that telescope and adjust to remove and replace the defective module in the device assembly. Further, as in FIGS. 3 and 4, the modules in the device assembly are connected by magnets. Magnets may include permanent magnets (for example, ferromagnet or ceramic magnet), electromagnets, or a combination of both. For example, permanent magnets may be used to connect the modules together and an electromagnet may be used by a drone. The drone may vary the applied current on an electromagnet to surpass the force applied by the permanent magnet to remove a module and apply a lower current to 'let go' of the module.

By varying the current over an electro-magnet on the robot arm, the robot arm may exceed the force exerted by the magnets holding the modules together such that one or more modules may be extracted and replaced simultaneously. In some embodiments, the magnetic contact points maybe selectively decoupled such that only one module is extracted at a time. In some embodiments, the magnetic contact points may be made into electrical contact points and used to charge a battery, diagnose modules, to install software updates, and/or to force the defective module to permanently shut down such that a replacement module may be added without removing the defective module. In some embodiments, a UAV may have a magnetic coupling with flat surface contact points for charging a battery. Preferably, these contact points are attached to a robot arm that telescopes and pivots using, for example, a LIDAR controller and feedback mechanism to locate the power port receptacle and to position for charging; see http://www.robotshop.com/en/lidar.html. In some embodiments, a UAV may include a physical electrical connection for digital communication, for example, to re-flash a software image.

Illustrative methods 700 and 800 depicted in FIGS. 7 and 8, respectively, refer generally to a modular device, and include a modular device assembly, as described with reference to FIGS. 2A-2B, 3A-3C and 4A-4B.

Although a number of techniques are disclosed herein for a UAV performing maintenance on a modular device assembly. FIGS. 7 and 8 are flow diagrams of particular illustrative methods for autonomous servicing of a modular device assembly, in accordance with various embodiments. Although the operations with reference to FIGS. 7 and 8 are illustrated in a particular order and depicted once each, these operations may be repeated or performed in a different order or by more than one UAV, as suitable. Additionally, various operations may be omitted, as suitable.

Figure 7:
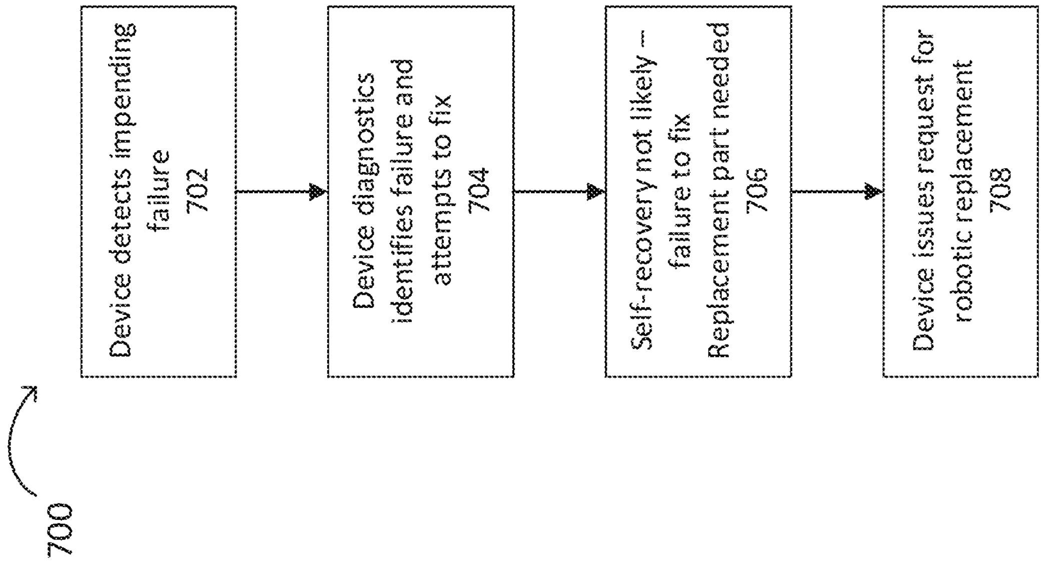
FIG. 7 is a simplified flowchart illustrating potential operations that may be associated with the failure of a modular device assembly in accordance with an embodiment.

FIG. 7 is a flow diagram of illustrative method 700 of a service request by a modular device, in accordance with various embodiments. As depicted, the device is capable of self-diagnosing and recognizing potential failure, for example, a hardware fault, intrusion or incorrect behavior such as device is losing power or the memory is full. Self-diagnostics are known in the art; see, for example, https://en.wikipedia.org/wiki/Power-on_self-test. At 702, device detects an impending failure. At 704, device identifies the failure and attempts to fix the failure. At 706, device recognizes that self-recovery is unlikely and determines that a component needs replacing. At 708, device issues a request for service. The request for service may be a beacon or other signal via the communication circuitry repeated at regular intervals for a UAV to "hear". The device may shutdown all functions other than signaling and enter a "sleep mode" until service is performed. In some embodiments, the device will continue to operate until failure occurs. Once in failure, the device may be configured to activate a signal for service or may simply fail without sending a signal.

Figure 8:
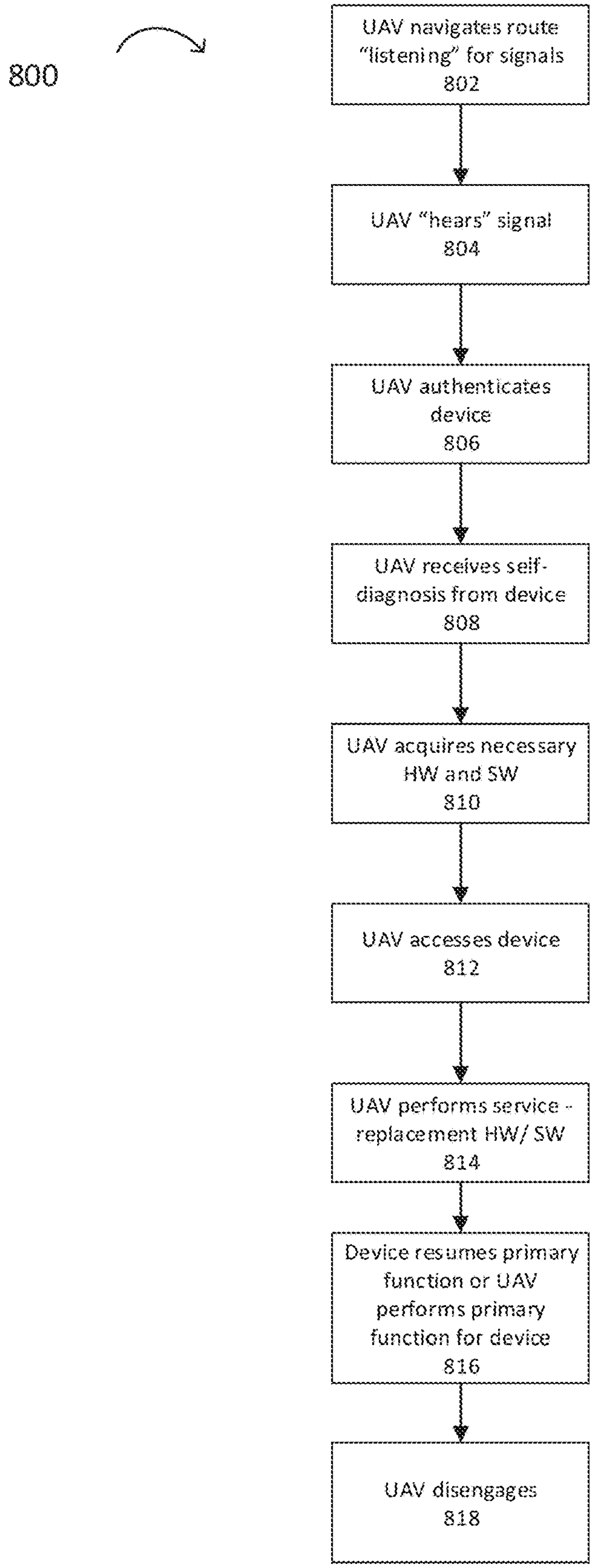
FIG. 8 is a simplified flowchart illustrating potential operations that may be associated with the maintenance and repair system of a modular device assembly in accordance with an embodiment.

FIG. 8 is a flow diagram of illustrative method 800 of autonomous servicing of a modular device assembly, in accordance with various embodiments. At 802, a UAV is configured to navigate a path or route "listening" for signals from devices. For example, the UAV maybe programmed to navigate around a forest where sensors have been placed to monitor rainfall. The UAV may repeat this route until a signal is received or may navigate the route at defined times or for a defined number of times in a time period.

At 804, the UAV "hears" or receives a signal indicating a device needs servicing. The UAV may autonomously position itself near the modular device such that low-power communication may be established. The UAV may securely communicate via short range protocol, for example, via a Bluetooth link (as described above in relation to FIGS. 5 and 6). The UAV may locate the device using any suitable means, such as a radio beacon, machine vision, or, a combination, for example, a radio beacon and then machine vision when located near the device. In some embodiments, the device may send information, such as maps, broadcast IDs, and images, to the UAV to facilitate locating the device.

At 806, the UAV may authenticate the device to confirm the identity of the device, or may authenticate at another time. In some embodiments, authentication may require the UAV to provide signed attestation evidence that includes the trusted compute base (TCB) version and other relevant evidence. If the evidence indicates a compromised system, the UAV may attempt to recover a clean TCB, for example, by forcing a safe mode reboot. If the original evidence or subsequent evidence is acceptable for authentication, the UAV may proceed (based on a pre-defined policy) to the next maintenance stage. In some embodiments, the device may issue an encrypted key to the UAV—only UAVs with a key may alter the functionality of the device. In some embodiments, the device may include tamper resistant features that enable the device to self-destruct if an unknown UAV attempts to connect without proper authentication. In some embodiments, the UAV may make a device inaccessible to unauthorized parties by erasing software, by destroying hardware, by bringing hardware to a controlled location for recycling, among others. In some embodiments, a UAV may be programmed to navigate to a series of devices and check on the device. For example, the UAV may authenticate the device, request a status, perform diagnostics or, if the device is not functioning, may wake up the device by scanning with RFID and/or providing a power source. When using RFID, which includes NFC and other scan-powered radios, the UAV may scan the device to power it on and acquire data and diagnostic alerts, for example, a self-diagnostic report. Alternatively, the UAV may perform diagnostics to determine the type of service, i.e., repair or replacement.

At 808, the UAV receives the self-diagnosis performed by the device to determine the service requirements. The UAV may communicate with the device using wireless communications or may navigate to the device and dock (physically connect), as described above with reference to FIG. 6. In some embodiments, the UAV performs diagnostics on the device to determine the service requirements. The UAV may carry extra parts such as replacement modules and software for performing the service immediately.

At 810, if the UAV does not have the necessary hardware and/or software, the UAV may acquire them from a central repository (home base), from neighboring devices, or by requesting another UAV to "fetch" the hardware and/or software. A hardware and software repository may be located at central location (i.e., home base) or may be located closer to the service area so that UAVs travel shorter distances to retrieve replacement parts. The repository may house servers for downloading device data collected by the UAVs. The repository may store UAVs that are loaded with software and hardware for performing maintenance. The UAVs may be dispatched automatically as requests from devices are received. In some embodiments, a centralized control unit may be used to manage UAVs and track service requests and completed maintenance.

At 812, the UAV navigates to the device and accesses the device to perform maintenance. The UAV may locate the device by any suitable means as described above. The UAV may authenticate the device prior to performing maintenance.

At 814, the UAV services the device, for example, by replacing a module, updating software, transferring collected data to free memory space and/or charging a battery. The term "service" or "maintenance" may refer to electronically serviceable, physically serviceable, and/or physically replaceable. Electronic service may include any system update such as OS firmware, applications, and/or trusted compute base (TCB) recovery. A UAV with a robot arm may readily perform physically serviceable or physically replaceable service on a modular device having magnetic contact points. A module may be removed by the robot arm and replaced. Similarly, a device may be removed by the robot arm and replaced in its entirety. Preferably, the base is not replaced and the new device may be installed on the existing base. In some embodiments, the robot arm may use a greater physical force to disengage the magnets holding the modules in place, either to a base or to each other. In some embodiments, the robot arm may have corresponding magnetic contact points with a stronger magnetic field or an electromagnet to modify current levels of the magnets such that the device assembly may be separated from the base and the modules may be separated from each other. In some embodiments, more than one UAV may complete the service, for example, one UAV may service hardware and another UAV may service software.

In some embodiments, the device may have physical barriers that require the device provide physical access to the UAV. For example, the device may have to open a port to enable hardware connectivity of the UAV or installation of a replacement module. In some embodiments, the hardware ports may be protected by various types of actuators to make the ports available or unavailable. Other types of tamper resistant features may be included to make the ports resistant to physical access, in place of or in addition to software-based authentication. In another example, the device may be located within a structure and may be configured to provide physical access to the UAV by opening a door.

At 816, the device is fixed and resumes its primary function. In some embodiments, the UAV may reposition a device to enhance the functionality, for example, repositioning the device for better solar powering or moving the device to enable better radio connectivity. In some embodiments, the UAV may remain with the device that could not be repaired. If remaining engaged with the device, the UAV may perform in place of the device or may perform a function for the device. In some embodiments, the UAV may remain engaged and may perform a function for the device such that, by performing the function, the device may resume normal operation.

At 818, the UAV disengages. The UAV may resume navigating its route or may return to a central repository to transfer data, discard failed modules, and/or restock.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The terms “a” or “an” as used herein, as is common in patent documents, include one or more than one, independent of any other instances or usages of “at least one” or “one or more.”

The above description includes references to the accompanying drawings, which form a part of the detailed description. The drawings show, by way of illustration, specific embodiments that may be practiced. These embodiments are also referred to herein as “examples.” Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The following paragraphs provide examples of various ones of the embodiments disclosed herein.

Example 1 is an apparatus including: a plurality of modules, each module including: a communications port; control circuitry; and one or more contact points configured to couple the modules; wherein, when the plurality of modules are coupled via the contact points, the communications ports are connected to form a bus for communications between modules.

Example 2 may include the subject matter of Example 1, and may further specify that the one or more contact points is a magnet.

Example 3 may include the subject matter of Example 1, and may further include a base including one or more contact points for coupling to the plurality of modules.

Example 4 may include the subject matter of Example 3, and may further specify that each of the plurality of modules are coupled to the base.

Example 5 may include the subject matter of Example 3, and may further specify that one of the plurality of modules is coupled to the base.

Example 6 may include the subject matter of Example 1, and may further include a sensor disposed on a module.

Example 7 may include the subject matter of Example 1, and may further include communication circuitry disposed on a module configured to transmit a signal.

Example 8 may include the subject matter of Example 1, and may further specify that the plurality of modules form concentric rings when coupled.

Example 9 is a method for using a UAV to perform maintenance on a modular device including: receiving a request to perform maintenance on a modular device; acquiring modular device hardware; navigating to the modular device; and performing maintenance on the modular device hardware.

Example 10 may include the subject matter of Example 9, and may further include navigating a route to monitor for a signal from the modular device indicating the request to perform maintenance.

Example 11 may include the subject matter of any of Examples 9-10, and may further include authenticating the modular device.

Example 12 may include the subject matter of any of Examples 9-11, and may further include performing diagnostics on the modular device.

Example 13 may include the subject matter of any of Examples 9-12, and may further include acquiring modular device software; and performing maintenance on the modular device software.

Example 14 may include the subject matter of any of Examples 9-13, and may further specify that the maintenance performed on the modular device hardware includes replacing a module.

Example 15 may include the subject matter of any of Examples 9-14, and may further include performing a function for the modular device wherein, by performing the function, the modular device resumes normal function.

Example 16 is a system for using a UAV to perform maintenance on a modular device including: an apparatus including a plurality of modules, each module including: a communications port; control circuitry; and one or more contact points configured to couple the modules; wherein, when the plurality of modules are coupled via the contact points, the communications ports are connected to form a bus for communications between modules; and a UAV, wherein the UAV is configured to: receive a request to perform maintenance on a modular device; acquire modular device hardware; navigate to the modular device; and perform maintenance on the modular device hardware.

Example 17 may include the subject matter of Example 16 and may further specify that the UAV is further configured to: navigate a route to monitor for a signal from a modular device indicating the request to perform maintenance.

Example 18 may include the subject matter of any of Examples 16-17, and may further specify that the UAV is further configured to: authenticate the modular device.

Example 19 may include the subject matter of any of Examples 16-18, and may further specify that the UAV is further configured to: perform diagnostics on the modular device.

Example 20 may include the subject matter of any of Examples 16-19, and may further specify that the UAV is further configured to: acquire modular device software; and perform maintenance on the modular device software.

Example 21 may include the subject matter of any of Examples 16-20, and may further specify that the UAV is further configured to: perform a function for the modular device wherein, by performing the function, the modular device resumes normal function.

Example 22 is at least one machine readable medium including one or more instructions that when executed by at least one processor, cause the at least one processor to: receive a request to perform maintenance on a modular device; acquire modular device hardware; navigate to the modular device; and perform maintenance on the modular device hardware.

Example 23 may include the subject matter of Example 22, and may further include one or more instructions that when executed by the at least one processor, cause the at least one processor to: navigate a route to monitor for a signal from the modular device indicating the request to perform maintenance.

Example 24 may include the subject matter of any of Examples 22-23, and may further include one or more instructions that when executed by the at least one processor, cause the at least one processor to: authenticate the modular device.

Example 25 may include the subject matter of any of Examples 22-24, and may further include one or more instructions that when executed by the at least one processor, cause the at least one processor to: perform diagnostics on the modular device.

Example 26 may include the subject matter of any of Examples 22-25, and may further include one or more instructions that when executed by the at least one processor, cause the at least one processor to: acquire modular device software; and perform maintenance on the modular device software.

Example 27 may include the subject matter of any of Examples 22-26, and may further specify that the maintenance performed on the modular device includes replacing a module.

Example 28 may include the subject matter of any of Examples 22-27, and may further include one or more instructions that when executed by the at least one processor, cause the at least one processor to: perform a function for the modular device wherein, by performing the function, the modular device resumes normal function.

Example 29 is a system including: means for receiving a request to perform maintenance on a modular device; means for acquiring modular device hardware; means for navigating to the modular device; and means for performing maintenance on the modular device hardware.

Example 30 may include the subject matter of Example 29, and may further include means for navigating a route to monitor for a signal from the modular device indicating the request to perform maintenance.

Example 31 may include the subject matter of Example 29, and may further include means for authenticating the modular device.

Example 32 may include the subject matter of Example 29, and may further include means for performing diagnostics on the modular device.

Example 33 may include the subject matter of Example 29, and may further include means for acquiring modular device software and means for performing maintenance on the modular device software.

Example 34 may include the subject matter of Example 29, and may further include means for performing a function of the modular device wherein, by performing the function, the modular device resumes normal function.

Example 35 is a system including means for performing the method of any of Examples 9-15.

Example 36 may include the subject matter of Example 35, and may further specify that the means comprise machine-readable code that when executed, cause a machine to perform one or more steps of the method of any of Examples 9-15.

What is claimed is:

1. An apparatus, comprising:

a first module and a second module, each of the first module and the second module including a frame or housing including a communications port, control circuitry, and one or more contact points configured to couple the first and second modules, wherein at least one of the one or more contact points of the second module is on a top surface of the frame or housing of the second module, and at least one of the one or more contact points of the first module is on a bottom surface of the frame or housing of the first module; and a base including a first communication port corresponding to the communications port of the first module, and a second communication port corresponding to the communications port of the second module, wherein a distance between the second communication port and an edge of the base is less than a distance between the first communication port and the edge of the base.

2. The apparatus of claim 1, wherein at least one of the one or more contact points includes a permanent magnet.

3. The apparatus of claim 1, wherein at least one of the one or more contact points of the second module is on a bottom surface of the frame or housing of the second module.

4. The apparatus of claim 1, wherein the first module includes an antenna on a top surface of the first module.

5. The apparatus of claim 1, wherein the base includes one or more contact points corresponding to at least one of the one or more contact points of the second module.

6. The apparatus of claim 1, wherein the communications port of the first module or the second module is to recharge a battery, download software or a firmware image, run a diagnostic, or run a test.

7. An apparatus, comprising:

a first module and a second module, each of the first module and the second module including a frame or housing including a communications port, control circuitry, and one or more contact points configured to couple the first and second modules, wherein the first module includes a pillar extending past an edge of the frame or housing of the first module, the pillar includes one or more contact points, and the frame or housing of the second module has an opening through which the pillar extends; and a base including one or more first contact points corresponding to the one or more contact points of the pillar, and one or more second contact points corresponding to the one or more contact points of the second module, wherein a distance between the one or more second contact points and an edge of the base is less than a distance between the one or more first contact points and the edge of the base.

8. The apparatus of claim 7, wherein the second module has a ring or cube that extends past an edge of the frame or housing of the second module, and the ring or cube includes at least one of the communications port or the one or more contact points of the second module.

9. The apparatus of claim 7, wherein the one or more contact points include a permanent magnet.

10. The apparatus of claim 7, wherein the first and second modules form concentric rings when coupled.

11. The apparatus of claim 7, wherein the communications port of the first module or the second module is to recharge a battery, download software or a firmware image, run a diagnostic, or run a test.

12. The apparatus of claim 1, wherein the base is a plate.

13. The apparatus of claim 7, wherein the base is a plate.

* * * * *